Aug. 30, 1932.  I. ELLIOTT  1,874,699
DEVICE FOR PLACING PIE TRAYS ONTO OR
REMOVING THEM FROM A TRAVELING OVEN
Filed June 9, 1930    3 Sheets-Sheet 1
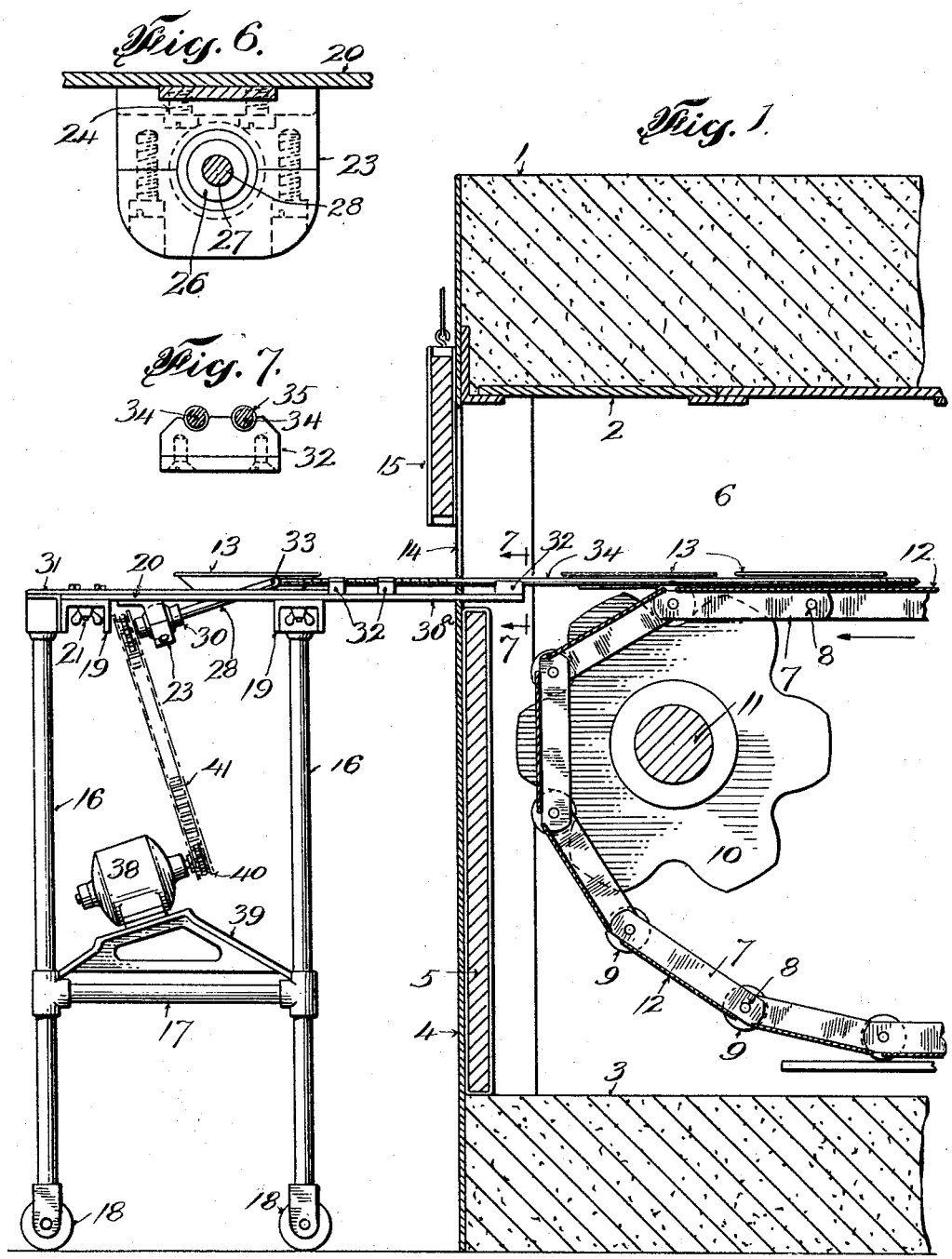
INVENTOR
Irwin Elliott
BY
Charles G. Hensley
ATTORNEY

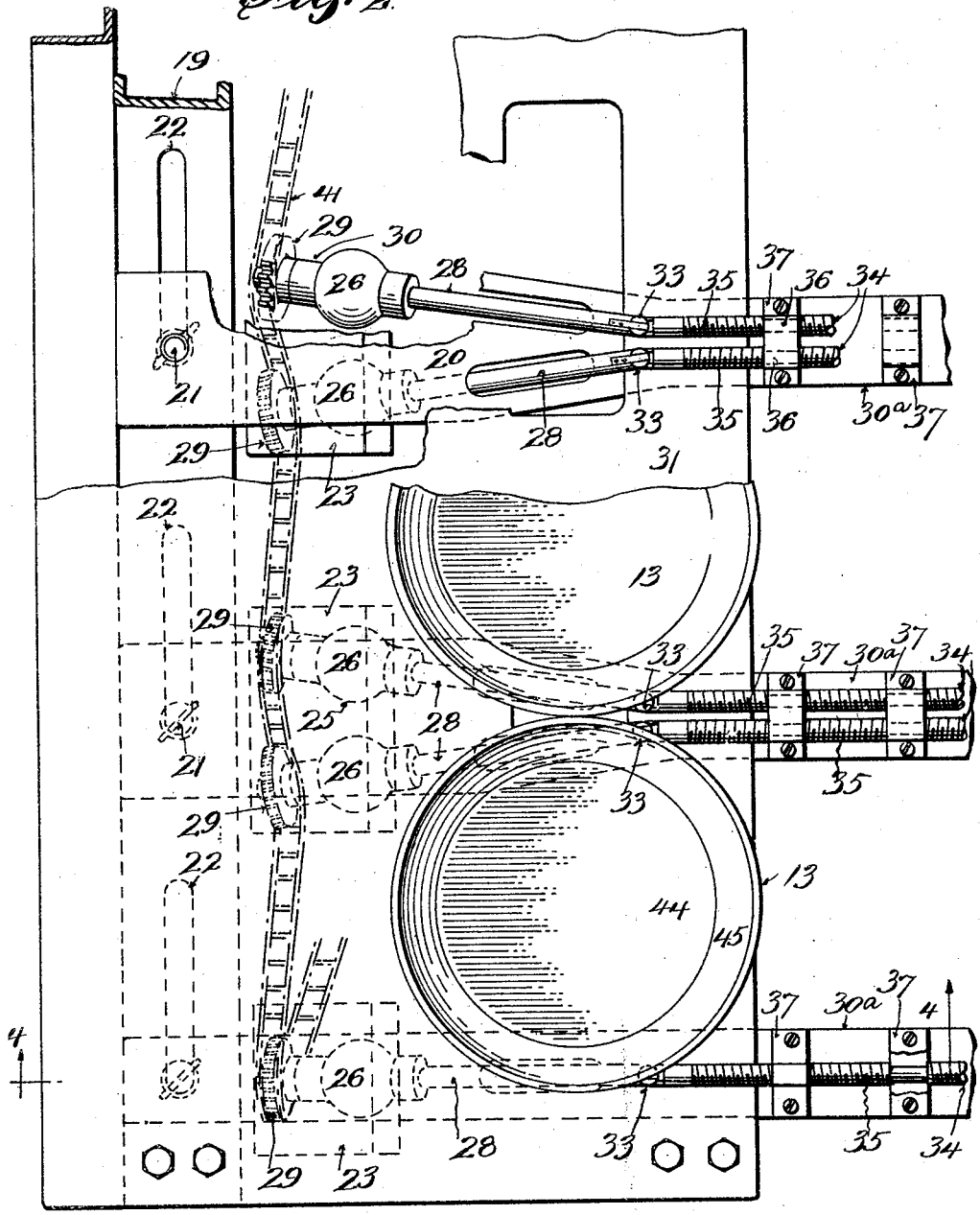

Aug. 30, 1932.　　　　I. ELLIOTT　　　1,874,699
DEVICE FOR PLACING PIE TRAYS ONTO OR
REMOVING THEM FROM A TRAVELING OVEN
Filed June 9, 1930　　　3 Sheets-Sheet 3
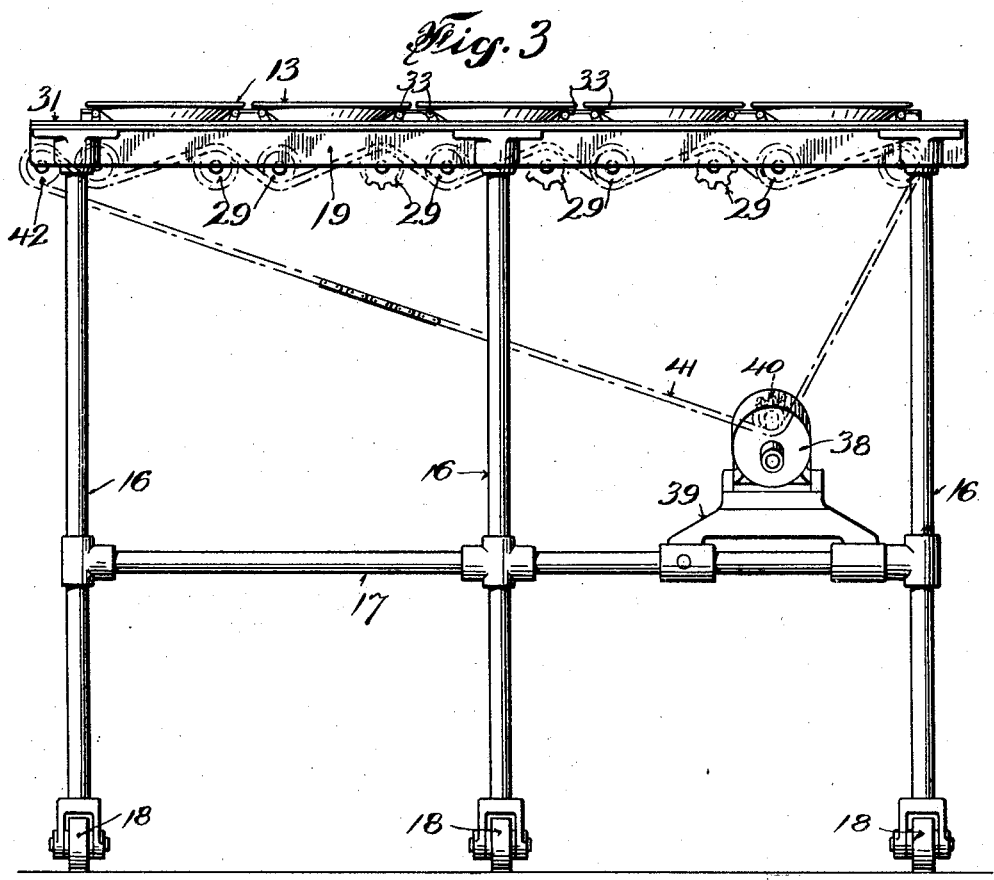
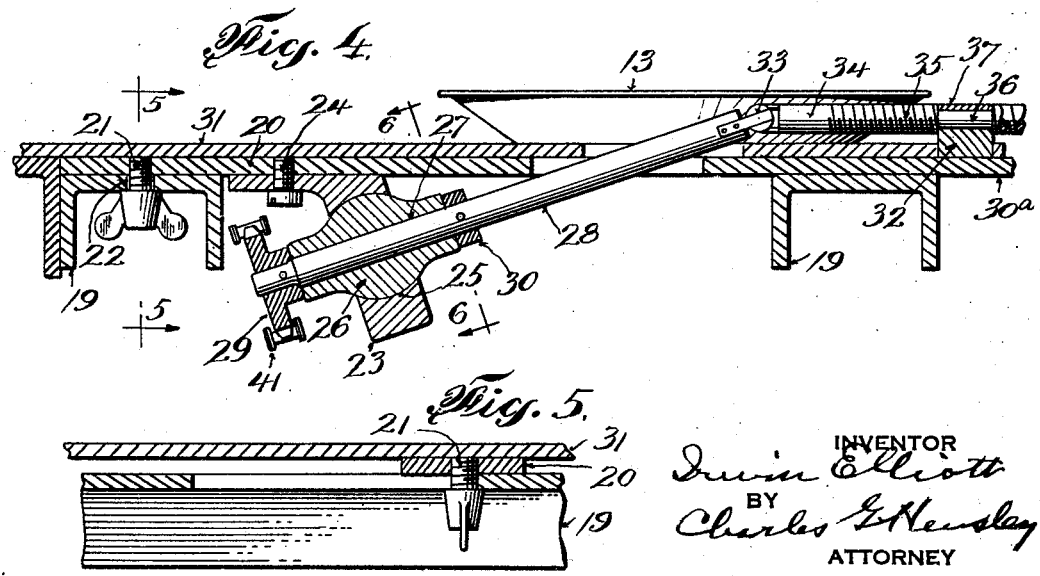
INVENTOR
Irwin Elliott
BY
Charles G. Hensley
ATTORNEY Patented Aug. 30, 1932

1,874,699

UNITED STATES PATENT OFFICE

IRWIN ELLIOTT, OF HARMON, NEW YORK, ASSIGNOR TO WILLIAMS OVEN MFG. CO., OF NEW YORK, N. Y., A CORPORATION OF NEW YORK

DEVICE FOR PLACING PIE TRAYS ONTO OR REMOVING THEM FROM A TRAVELING OVEN

Application filed June 9, 1930. Serial No. 459,932.

The object of the present invention is to provide an efficient and simple device for automatically removing pie trays from the conveyor of a traveling oven and the device is also adapted to be used for placing or feeding pie trays onto the conveyor of the traveling oven. Where pies are baked in traveling ovens it has been common practice to apply or feed the pie trays manually onto the conveyor and to manually remove the trays at the delivery end of the conveyor. In some cases the trays have been allowed to slide off the delivery end of the oven conveyor upon an inclined shelf so that the trays were removed from the conveyor by gravity. However, this arrangement is unsatisfactory because it very often causes injury to the pie crust and where the filler of the pie is in a mobile or fluid condition as the pie leaves the oven, the tray must be kept in a horizontal position until the pie is cooled off.

The object of the present invention is to provide a device which will automatically remove the pie trays from the conveyor of the traveling oven and retain the trays in the same horizontal plane as when they are traveling on the oven conveyor, so that they will not be tilted as they are removed nor are they injured by any operation of the present device.

Another object is to provide an automatic device of the character described, which will permit the several conveyors of the traveling oven to be adjusted in their lateral relation to handle pies of different sizes, the present device being adjustable with the conveyors so that it is readily adapted or adjustable for different size pie trays.

While I have shown the invention embodied in a device for removing trays from a traveling oven, it will be apparent that the same device may be used for feeding the pie trays onto the oven conveyor at the receiving end thereof. The only change required to apply the invention to the latter use is to position the same to face the inlet or feed end of the traveling oven and to reverse the direction of operation of the propelling members. In either use of the invention the trays are either fed onto or removed from the conveyor of the traveling oven in horizontal alignment with the top of the conveyor so that the trays and the pies carried thereon are not tipped during the operation of feeding them onto or removing them from the traveling oven. These operations are carried out automatically as will be pointed out hereinafter.

While I have shown my invention as used for handling pie trays it is to be understood that the same may be used for automatically handling other goods in connection with an oven conveyor.

In the drawings forming part of this application,

Figure 1 is a view showing in longitudinal section the discharge end of a traveling oven, together with my apparatus in side elevation showing the same in position to remove the pie trays from the oven conveyor, Figure 2 is a plan view of the device for removing the trays, Figure 3 is a front elevation thereof, Figure 4 is a sectional view taken on the line 4—4 of Figure 2, Figure 5 is a sectional view taken on the line 5—5 of Figure 4, Figure 6 is a sectional view taken on the line 6—6 of Figure 4, and Figure 7 is a sectional view taken on the line 7—7 of Figure 1.

In the drawings I have illustrated only such portions of the traveling oven as are necessary to teach one application of my invention. In Figure 1 I have shown a portion of the top wall 1 of the oven structure consisting of an insulating material having a metal lining 2. The bottom wall 3 is also of heat insulating material and the front wall 4 consists of an insulating lining 5 together with a metal face plate. Within these walls is formed the baking chamber 6 in which the product is baked while being conveyed therethrough by the traveling conveyor or movable hearth. The latter consists of an endless chain 7 having relatively long links pivoted to each other at 8, the pins on which the links are pivoted being supplied with rollers 9 which engage in the large teeth of a sprocket wheel 10 which is mounted on a cross shaft 11. The parts of the conveyor or traveling hearth shown herein comprise the rear or delivery end of a conveyor from which the product is delivered at the end of a baking operation.

Usually there are hearth plates 12 mounted on the links of the chain which, when the chain is running in the upper, straight run, lie contiguous to each other and form a continuous moving hearth to receive and hold as well as to convey the containers having the product therein. I have shown by way of example pie plates 13 of usual form being conveyed through and from the baking chamber. In the rear wall of the oven there is a doorway 14 through which the product is delivered from the conveyor and this may be partly or fully closed by the vertically sliding door 15 commonly used in ovens of the type illustrated.

The device for delivering the product from the traveling oven is preferably mounted on a movable rack or frame which is here shown as consisting of a number of vertical pipes 16 suitably connected with each other by horizontal end and cross pipes 17 by means of L and T connections, as shown in Figure 3. The lower ends of the several vertical pipes 16 are provided with rollers or casters 18 to facilitate movement of the carriage in front of the oven, so that the present device as a whole may be bodily moved away from the oven when not in use, or when it is desired to have close approach to the oven for cleaning and various other purposes. The upper ends of the several vertical pipes 16 are connected with each other by longitudinal beams 19 which may be permanently united therewith. There are supporting plates 20 resting and sliding upon the longitudinal beams 19 and each of these plates carries one of the units of a plate removing device.

Each of these cross plates is made adjustable lengthwise of the rack or laterally of each other in order to adjust the distance between adjacent plate removing devices, so that the spacing will conform to different size pie trays. Each plate is provided with a threaded aperture to receive the shank of a bolt 21 which passes through an elongated slot 22 in the horizontal web of the rear longitudinal beam 19 of the rack and the wing nut on this bolt is adapted to engage against the under surface of the horizontal web of the horizontal beam for the purpose of locking the plate 20 in various positions of adjustment. By slacking off the bolt 21 the plate 20 together with the parts carried thereby may be adjusted laterally or along the beams 19 to vary the spacing of the several removing devices; and when the adjustment has been made the bolt 21 is tightened to fix the position of the plate during operation.

In Figure 2 I have shown three of the units for delivering the trays, one of which is an end unit and the other two intermediate units, whereas in Figure 3 I have shown sufficient units to simultaneously remove trays from five oven conveyors arranged parallel and adjacent to each other. It will be understood that the device may be made for a single oven conveyor or for any greater number arranged in parallel relation. There are brackets 23 attached to the under side of the several plates 20 by means of bolts 24 and these brackets have spherical sockets 25 to receive a spherical bearing member 26 so that the latter may have a universal pivotal motion within the bracket 23. The brackets 23 are each provided with two of the sockets 25 except that the brackets at each end of the machine are only provided with one such socket as shown in Figure 2.

The bearing member 26 has a longitudinal bore 27 therethrough and through this projects a shaft 28. One end of the shaft has fixed to it a sprocket wheel 29 which bears against one end of the bearing member 26, whereas a collar 30 attached to the shaft bears against the opposite end of the member 26 so that the shaft may revolve within the spherical bearing member, but it is prevented from shifting lengthwise therein. Where the brackets 23 are provided with two sockets to receive and hold two of the spherical bearing members 26 the adjacent shafts 28 are slightly divergent in relation to each other, as shown in Figure 2, in order that the upper ends of these shafts may be brought close together. The adjustable plates 20 are provided with extensions or brackets 30a projecting forwardly of the top or table member 31 and toward the oven, preferably a sufficient extent to cause these members to extend through the lower portions of the door opening 14 of the oven, and to reach into the oven to a point adjacent the oven conveyor. On these extensions there are provided brackets or bearing members 32, there being three such members for each shaft. There is connected by universal joint 33 with each shaft 28 a horizontally extending shaft 34 which is provided with a peripheral thread 35 extending substantially throughout the length of each shaft member 34. At intervals each shaft 34 is provided with a reduced and threadless portion 36 and these reduced portions are journaled in circular recesses in the several bearing members 32. There are caps 37 attached by screws to the tops of some of the bearing members 32 to complete the enclosure of the reduced portions 36 of the shaft 34, so that the brackets 32 and their caps 37 form journal sockets for the reduced portions 36 of the shaft; and the caps 37 at the top and sides are adapted to lie flush with the threaded periphery of the shaft as shown in Figure 2.

The cap 37 may be omitted from the bearing member 32 which projects into the baking oven, as shown in Figure 1 if desired, as the caps applied to the bearing members which remain outside of the oven will suffice to hold the shafts 34 in place. The construction of the shaft 34 and its connection with the shaft 28 is the same for all of these shafts, so that the foregoing description applies to each.

The shafts 28, 34 are all adapted to be revolved and for this purpose I have shown a motor 38 mounted on a motor support 39 which is itself mounted on one of the horizontal bars of the frame, and in such position that the shaft of the motor is inclined to lie approximately parallel with the several shafts 28. The shaft of this motor is provided with a sprocket wheel 40 around which engages an endless chain 41 driven by the sprocket of the motor; and this chain passes over an idler 42 at one end of the frame, as shown in Figure 3. This chain passes alternately under and over the sprocket wheels 29 arranged on the several shafts 28 and the chain 41 engages with the teeth of these several sprockets, so that adjacent shafts are revolved in relatively opposite directions, and therefore the shafts 34 common to any given pie plate are revolved in relatively opposite directions. The chain 41 engages with all of the sprockets 29 in the manner just described and after leaving the sprocket on the extreme right hand shaft in Figure 3, it extends downwardly to the sprocket on the motor shaft. The chain, which is continuous or endless, is operated whenever the motor is in operation and it therefore drives all of the sprockets 29 and as these are fixed to the several inclined shafts 28 it drives the shafts 34.

Operation

Assuming that the present device has been designed to remove simultaneously five rows of pie plates from the traveling oven, as shown in Figure 3, the carriage or table will be positioned adjacent the delivery end of the oven so that the several extended brackets 30a project through the lower portion of the delivery opening of the oven, as shown in Figure 1. The several threaded shafts 34 extend into the oven, so that they lie in pairs on opposite sides of the path of each line of pie plates 44 as the latter are conveyed with the hearth 12 of the oven conveyors. Preferably, these shafts project into the oven sufficiently so that the pie trays are conveyed between the projecting ends of adjacent shafts, as shown in Figure 1, and so that the pie trays are carried well in between adjacent shafts 34 before the hearth plates begin to turn and to revolve around the propelling sprocket 10 of the oven conveyor. The shafts 34 are so positioned that they receive the pie plates in the same horizontal plane in which the plates are being conveyed through the oven by the conveyor. As the row of pie plates is moved horizontally along by the oven conveyor, each plate moves between the free or projecting ends of two of the shafts 34 so that the flange 45 of the pie plate lies above the plane of the threaded shafts 34 and the sides of the plates rest on the threaded peripheries of the shafts. These shafts are being continually revolved by reason of the propelling action of the sprocket of the motor which drives the endless chain 41 and which in turn operates on the several sprocket wheels 29 to revolve the shafts 28. As the latter are individually connected to the shafts 34 the latter are continually revolved.

The threaded shafts 34 engaging one row of plates are revolved in relatively opposite directions, but they engage on opposite sides of the same plates and therefore, assuming that the threads of the shafts 34 are alternately right hand and left hand threads, the two shafts which engage the same row of plates will propel the plates in the same direction. As the plates leave the oven conveyor they rest upon and are supported solely by the threaded shafts 34 and as the latter are continually revolving their threaded peripheries cause the plates to travel along on the shafts from right to left in Figure 1. The plates are advanced along the shafts 34, passing through the discharge opening 14 of the oven until they are delivered upon the table 31 of the carriage and from there they may be moved away by hand or any other suitable means. The object of the present device is to convey the pie plates from the oven conveyor out of the oven and onto the carriage while holding them in the same horizontal position in which they travel while in the oven. By forming the clamping plates 37 flush with the peripheries of the threads of the shaft 34 the pie plates will slide over the tops of these.

It will be apparent that the shafts 34 are adapted to convey the pie plates continuously and without manually handling from the point within the baking chamber near which the oven conveyor approaches the sprocket 10 so that the plates are received upon the shafts 34 while still in a horizontal position and the plates are conveyed out of the oven in the same horizontal plane so that the delivery of the pie plates will cause no disturbance to the contents of the several plates while the pies are still hot and in condition requiring delicate handling.

Each pair of threaded shafts 34 act on the single line of pie plates delivered by the oven conveyor and the action of each pair of threaded shafts is the same on each line of pie plates traveling with the oven conveyor. Where there are five lines of pie plates traveling on the oven conveyor there will be five parallel rows of plates delivered by the several rows or pairs of threaded shafts 34 upon the carriage as shown in Figure 3.

It will be apparent from the above that I have provided a device for automatically and mechanically delivering the pie trays from the oven conveyor through a discharge opening of the oven compartment onto a suitable support and in such manner that the pie trays are retained in horizontal position until they are delivered upon the external support or carriage. After the pie trays have been delivered outside the oven the pies begin to cool and when their temperature has been materially reduced the danger of disturbing the pies by tilting them may be no longer a serious factor, so that any means may be employed to remove the pies from the carriage or rack.

If the device has been adjusted to deliver pie plates of a given size or diameter and it is then desired to deliver pie plates of a smaller diameter, the several bolts 21 may be loosened and the several plates 20 will be adjusted along the carriage to bring adjacent plates 20 closer together, thereby reducing the lateral distance between the several threaded shafts 34 which engage the pie plates of any given row.

In other words, if the shafts 34 have been operating in positions so that the shafts of each pair operated say on fourteen inch pie plates and it is desired to adjust them to operate on say twelve-inch pie plates, then the plates 20 are shifted in relation to each other, so that the shafts 34 are moved two inches closer than the previous adjustment. The shafts in the newly adjusted positions will then engage the twelve inch plates in the same manner that they previously engaged the fourteen inch plates, delivering them from the oven in exactly the same manner.

I have described the present device as used for delivering plates from the oven but it is to be understood that the same device may be used for feeding the plates into the oven. In this case the device will be applied to the feed end of the oven in the same manner and in the same relation to the oven conveyor as indicated in Figure 1, but it will be necessary to reverse the direction of operation of the motor 38 because in feeding the plates into the oven as distinguished from delivering them therefrom, the threaded shafts 34 must be revolved in the opposite direction to secure the correct direction of motion or else the threads on the shafts 34 must be formed in a reverse directon. It will be obvious from the above that the present device may be used either for feeding pie plates or removing them from a traveling oven. In describing the device and its uses I desire it to be understood that I do not intend to limit my invention to the delivery of pies but to include all uses of the invention.

Having described my invention, what I claim is:

1. A conveyor for conveying individual containers, comprising spaced, parallel, revolvable shafts having spirals thereon and adapted to receive containers resting on said shafts, a support onto which said shafts are adapted to deliver said containers in a horizontal position, shafts for operating the first named shafts, said second shafts being inclined downwardly from the plane of said first shafts and connected thereto by universal joints, and means for operating said second shafts to revolve said first mentioned shafts.

2. A conveyor for conveying individual containers comprising spaced, revolvable shafts having spirals thereon on which containers are adapted to rest and to travel, a support onto which said shafts are adapted to deliver the containers in horizontal position, shafts extending downwardly through said support and having their upper ends connected with said first shafts by universal joints, and means for operating said second named shafts to cause them to revolve said first mentioned shafts whereby the containers will be advanced along the same onto said support.

3. A conveyor for conveying individual containers including a frame having a support to receive containers thereon, co-operating, spaced shafts having spirals thereon on which containers are adapted to rest and to travel, other shafts connected with said first shafts by universal joints and inclined downwardly below the plane of said support, pivotal bearings below said support for said second mentioned shafts, and means for revolving said second mentioned shafts for the purpose of revolving said first shafts to advance containers along the same.

4. A conveyor for conveying individual containers, including a frame, shafts having spirals thereon and arranged to support containers disposed between said shafts, said frame having a support for supporting containers in substantially the same horizontal plane as said shafts, other shafts connected with said first shafts by universal joints and extending downwardly below the plane of said support, sprockets on the lower portions of said second mentioned shafts, a chain engaging in reverse order with said sprockets, and means for operating said chain to drive the several shafts in relatively opposite directions.

5. A conveyor for conveying individual containers including a frame adapted to be placed adjacent a traveling oven, a plurality of shafts having spirals thereon and arranged in pairs, each pair of shafts being adapted to receive a row of containers resting on the shafts of a pair, other shafts connected with said shafts by universal joints and extending downwardly from the plane of said first shafts, sprockets on said second mentioned shafts and an endless chain engaging reversely around said sprockets for operating all of the shafts of said several pairs, and means for operating said chain.

6. A conveyor for conveying individual containers including a frame adapted to be placed adjacent the door of a traveling oven, a plurality of shafts having spirals thereon and arranged in pairs, each pair of shafts adapted to receive a row of containers supported on the shafts of a pair, other shafts connected by universal joints with said first mentioned shafts, and supporting means relatively adjustable on said frame in a direction laterally of said shafts, each of said supporting means being adapted to carry some of said first mentioned shafts to vary the distance between the latter.

Signed at the city, county and State of New York, this 4th day of June, 1930.

IRWIN ELLIOTT.